W. H. BRISTOL.
COMBINED CLOCK AND SHOCK RECORDER.
APPLICATION FILED JAN. 3, 1911.
1,000,147.
Patented Aug. 8, 1911.
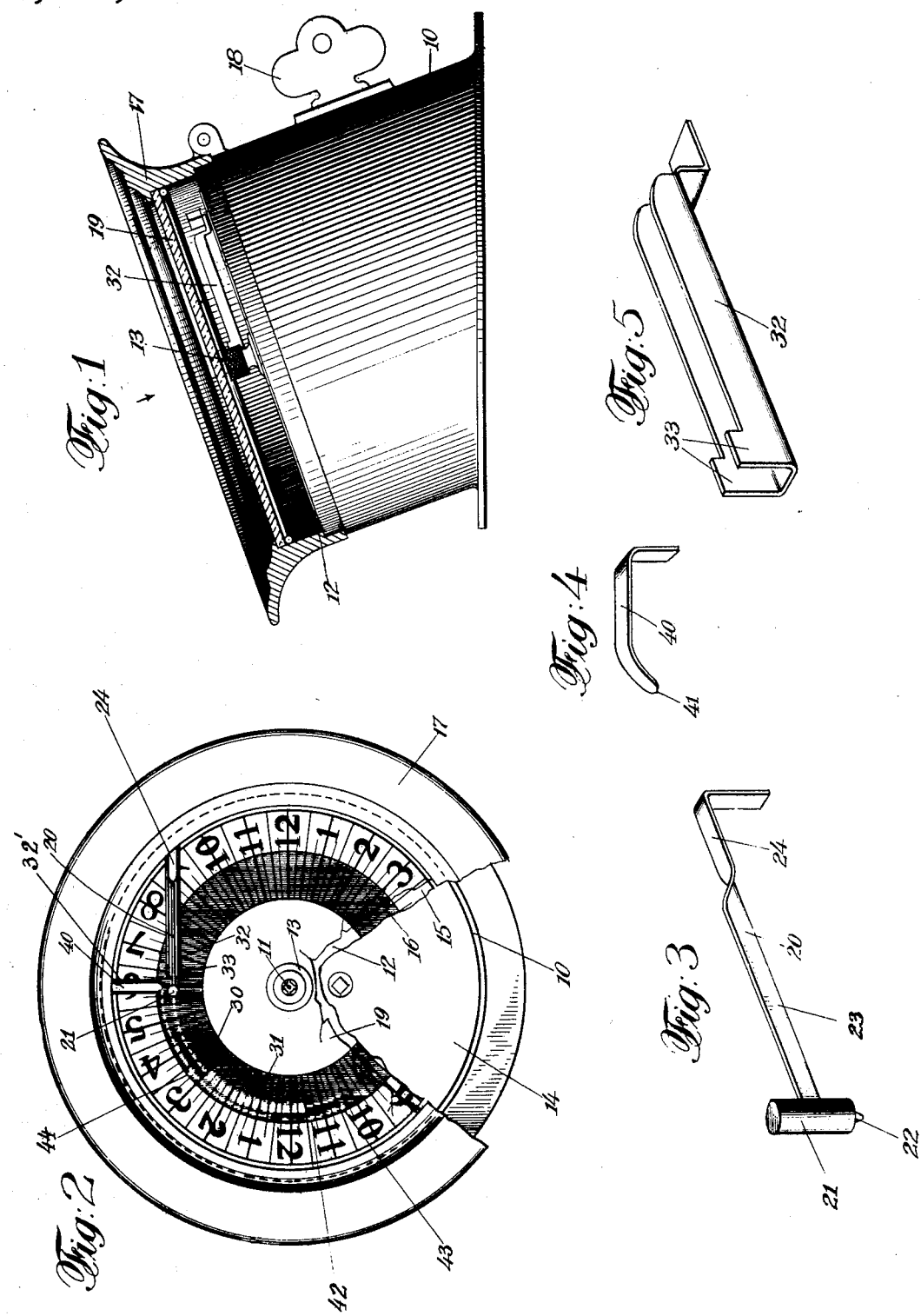

UNITED STATES PATENT OFFICE.

WILLIAM H. BRISTOL, OF WATERBURY, CONNECTICUT.

COMBINED CLOCK AND SHOCK-RECORDER.

1,000,147.   Specification of Letters Patent.   Patented Aug. 8, 1911.

Application filed January 3, 1911. Serial No. 600,494.

*To all whom it may concern:*

Be it known that I, WILLIAM H. BRISTOL, a citizen of the United States, and a resident of Waterbury, in the county of New Haven and State of Connecticut, have invented certain new and useful Improvements in Combined Clocks and Shock-Recorders, of which the following is a specification.

The invention relates to shock recording devices, and more particularly to a device adapted to record the actual time a vehicle is at rest and in motion.

It has for its object a device of this character which, in addition to providing a record of the actual time a vehicle is at rest and in motion, may serve also as a clock.

It has for its further object to dispense with all inking mechanism, and to provide marking devices so arranged and constructed that the same will not interfere in any way with the ready insertion and replacement of the chart upon which the record is to be made; also, to so safeguard the device that access to the chart is not possible without effecting a record of the same upon the said chart.

To this end my invention consists in certain features of construction hereinafter set forth, and shown in the accompanying drawings, in which—

Figure 1 is a side elevation partly in section of the improved device. Fig. 2 is a plan of the same looking in the direction of the arrow, Fig. 1, a portion of the cover and chart being broken away. Fig. 3 is a detail perspective of a vibrating arm and attached marker; and Fig. 4 is a similar view of an additional marking arm. Fig. 5 is a detail perspective of a protecting casing for said vibrating arm and marking arm.

Similar characters of reference designate corresponding parts throughout the several views.

Referring now to the drawings, 10 designates a suitable casing adapted to retain a clock mechanism (not shown) and which rotates an arbor 11. This arbor is adapted to rotate a chart 12 which may be atttached thereto in well-known manner by a securing nut 13. A plate 14 is provided beneath the chart 12 as a support for the same, and as a cover for the mechanism contained in the casing 10. The chart itself is divided into annular portions 15 and 16, suitably subdivided angularly, the outer portion 15 bearing the time designations. The inner portion 16 is the record portion, and its surface is suitably smoked, to form a smoked chart similar to that disclosed in my prior U. S. Letters Patent #748,918. Over this chart 12 is arranged a suitable cover 17 hinged or otherwise suitably connected to the casing 10, and preferably in such a manner that the connection may not be tampered with. A key 18 is adapted to lock the cover 17 to the casing 10 to prevent the unauthorized opening of the same. The cover carries a central portion 19 of glass through which the chart 12 is visible. The attachment of the casing 17 to a vehicle or the like is preferably made in such a manner that it is a difficult matter to remove it without unlocking the said cover 17.

From the inner wall of the cover 17 there extends a flexible vibrating arm 20, carrying at its outer end a weight 21 provided with a marking point 22 which is adapted to rest normally upon the smoked portion 16 of chart 12. The vibrating arm 20 is constructed of a material sufficiently flexible for the end in view, and is shown in the form of a thin band of metal whose outer portion 23 is arranged perpendicularly to the chart, and its inner portion 24 parallel thereto, whereby the said arm 20 with attached weight 21 may vibrate both laterally and vertically. The marking point 22 is arranged to vibrate laterally in a substantially radial direction when sufficient shock or vibration of any kind is imparted to the casing 10, as for example through the motion of a vehicle or automobile by which the same may be carried. The marking point 22, furthermore, is adapted to rest continually upon the smoked portion 16 of chart 12, and when not vibrating, simply marks a line 30 thereon as the said chart rotates. When, however, the said arm is vibrated laterally (radially) a band 31, instead of merely a line 30, is produced upon the chart, and the width of which is determined by the amplitude of vibration of the said arm. This amplitude is limited by means of a suitable channel shaped casing 32 within which the arm 20 is located, and which is adapted to be rigidly secured to the cover 17. This casing is, also, provided at its outer end with upward extensions 33 which are adapted to prevent the arm 20 from vibrating vertically out of its said casing 32, the extensions 33 coming in close proximity to the glass 19 of cover 17.

In order to provide a record of the opening and closing of the cover 17, whether authorized or otherwise, there is attached to the same an additional arm 40 suitably protected by a casing 32'. This arm extends radially inward and its marking end 41 rests constantly upon the chart 12, producing thereon a circular record line 42. The said arm is flexible in a direction perpendicular to the chart 12, and is given a slight bend, Fig. 5, so that the end 41 will come into contact with the portion 16 of chart 12 before the cover 17 is completely closed. Upon completely closing the cover, the end 41 is forced radially inward over the surface of the chart and produces a record 43 thereon. When in the normal, closed position of the cover 17, the marking end will thus rest farther in upon the chart 12 due to the slight initial pressure under which the same is placed. Upon opening the cover 17, this pressure of course is relieved and the arm 40 is drawn slightly outwardly, thus producing a second radial mark 44 upon the chart 12 and substantially at right angles to the mark 42, if sufficient time has elapsed between the opening and closing. Should the cover 17 have been immediately opened, the mark 44 would have coincided with mark 43. In immediately closing cover 17, mark 44 indicates both the opening and closing.

Both of the marking arms 20 and 40 as well as the protecting casings 32 and 32' being secured to the cover 17, do not in any way interfere with the insertion or replacement of chart 12, which may be effected by unlocking the said cover 17 through key 18, lifting the same and the attached markers and casings off the chart 12, and then removing the nut 13. The marking point 22 and the marking end 41 are located in the same radial line; and the latter, in conjunction with the time designations on portion 15, thus may serve to indicate the time of day in addition to performing its other function.

I claim:—

1. A device of the character set forth comprising: a suitable casing and a cover therefor; a chart support within said casing for a rotatable chart; and a flexible vibrating arm, and a marking point at one end of the same, said arm being carried by the said cover and its marking point adapted to make contact with the surface of said rotating chart.

2. A device of the character set forth comprising: a suitable casing and a cover therefor, and means to lock the same to said casing; a chart support within said casing for a rotatable chart; a flexible vibrating arm, and a marking point at one end of the same, said arm being carried by the said cover and its marking point adapted to make contact with the surface of said rotating chart; and a second arm carried by said cover to mark said chart upon opening said cover.

3. A device of the character set forth comprising: a suitable casing and a cover therefor, and means to lock the same to said casing; a chart support within said casing for a rotatable chart; a flexible vibrating arm, and a marking point at one end of the same, said arm being carried by the said cover and its marking point adapted to make contact with the surface of said rotating chart; and a second arm carried by said cover to mark said chart upon opening said cover and upon closing the same.

4. A device of the character set forth comprising: a suitable casing and a cover therefor, and means to lock the same to said casing; a chart support within said casing for a rotatable chart; a vibrating arm, and a marking point at one end of the same, said arm being carried by the said cover and its marking point adapted to make contact with the surface of said rotating chart; and a second, flexible arm carried by said cover adapted to move substantially radially over the surface of said chart to mark the same upon opening and upon closing said cover.

5. A device of the character set forth comprising: a suitable casing and a cover therefor; a chart support within said casing for a rotatable chart; a marker carried by said cover and adapted to make contact with the surface of said rotating chart; and a protecting casing for said marker carried by said cover.

6. A device of the character set forth comprising: a suitable casing and a cover therefor; a chart support within said casing for a rotatable chart; a vibrating arm, and a marking point at one end of same, said arm being carried by said cover and adapted to make contact with the surface of said rotating chart; and a protecting casing for said arm carried by said cover and adapted to limit the amplitude of vibration of said arm.

7. A device of the character set forth comprising: a suitable casing and a cover therefor; a chart support within said casing for a rotatable chart; a flexible vibrating arm, and a weighted marking point at one end of the same, said arm being carried by the said cover and its marking point adapted to make contact with the surface of said rotating chart.

Signed at New York, in the county of New York, and State of New York, this 31st day of December, A. D. 1910.

WILLIAM H. BRISTOL.

Witnesses:
LAURA E. SMITH,
FREDK. F. SCHUETZ.